(12) United States Patent
Lipford et al.

(10) Patent No.: US 6,980,523 B1
(45) Date of Patent: Dec. 27, 2005

(54) METHOD AND SYSTEM FOR FACILITATING END-TO-END QUALITY OF SERVICE IN A WIRELESS PACKET DATA SYSTEM

(75) Inventors: Mark A. Lipford, Leawood, KS (US); Manish Mangal, Overland Park, KS (US); Kevin R. O'Connor, Olathe, KS (US); Xianghong Zeng, Overland Park, KS (US); Mustafa Matalgah, Kansas City, MO (US); Saad Z. Asif, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 978 days.

(21) Appl. No.: 09/927,816

(22) Filed: Aug. 10, 2001

Related U.S. Application Data

(60) Provisional application No. 60/263,482, filed on Jan. 23, 2001.

(51) Int. Cl.[7] .............................................. H04L 12/26
(52) U.S. Cl. ...................... 370/252; 370/392; 379/329; 709/224
(58) Field of Search ................... 370/252, 392, 370/331, 356, 328, 401, 230, 235, 469, 253; 455/451, 452, 509, 436; 379/329; 709/226, 709/229, 232, 238, 245, 224, 221, 222

(56) References Cited

U.S. PATENT DOCUMENTS 6,636,502 B1 * 10/2003 Lager et al. ................ 370/352
6,728,365 B1 * 4/2004 Li et al. ..................... 379/329
6,735,175 B1 * 5/2004 Havens ...................... 370/236
6,760,312 B1 * 7/2004 Hitzeman ................... 370/252
6,765,909 B1 * 7/2004 Sen et al. ................... 370/392
6,801,776 B2 * 10/2004 Notanii et al. ............. 455/451
6,886,043 B1 * 4/2005 Mauger et al. ............ 709/238

OTHER PUBLICATIONS

TR 45, Inter-operability Specification (IOS) for CDMA 2000 Access Network Interfaces, PN-4545-RV-A Ballot Version, pp. 1-1002, Dec. 2000.

TR 45, Data Service Options for Spread Spectrum Systems: cdma2000 ISDN Interworking Service Option 37, PN-4692.13 (TIA/EIA/IS-707-A-2.13), Ballot Version, Jan. 2000.

TIA/EIA Interim Standard, cdma2000 Wireless IP Network Standard, TIA/EIA/IS-835, pp. 1-57, (2000).

TIA TR-45, CDMA Packet Data Service (C-PDS), Phase-1, PN-4720 (C-PDS PH1 [BLT Rev 0.11), pp. 1-133, (2000).

(Continued)

*Primary Examiner*—Chi Pham
*Assistant Examiner*—Prenell Jones

(57) ABSTRACT

A method and system for facilitating end-to-end quality of service in a 3G packet data network. A packet-data session is set up between a mobile station and a packet-data network, via a base station and a packet data serving node (PDSN). The base station manages quality of service for the session as it passes over the air interface, and the PDSN manages quality of service for the session as it passes into the packet-data network. The PDSN translates between quality of service on the packet-data network and quality of service on the air interface, and the PDSN and base station communicate the quality of service information, so that both the base station and PDSN can work to set up consistent levels of quality of service on their respective links.

19 Claims, 5 Drawing Sheets

OTHER PUBLICATIONS

TR 45, Data Service Options for Spread Spectrum Systems—Addendum 2, PN-4692 (TIA/EIA/IS-707-A-2), Ballot Resolution Version, pp. 1-2, Jun. 2000.

TR 45, Data Service Options for Spread Spectrum Systems: AT Command Processing and the Rm Interface, PN-4692.3 (TIA/EIA/IS-707-A-2.3), Ballot Version, pp. 1-6, Jan. 2000.

TR 45, Data Service Options for Spread Spectrum Systems: Radio Link Protocol Type 3, PN-4692.10, TIA/EIA/IS-707-A-2.10, Ballot Version, pp. 1-1 thru 4-18, Jan. 2000.

TR 45, Data Service Options for Spread Spectrum Systems: cdma2000 High Speed Packet Data Service Option 33, PN-4692.12, TIA/EIA/IS-707-A-2.12, Ballot Version, pp. 1-1 thru 4-2, Jan. 2000.

TR 45, Data Service Options for Spread Spectrum Systems: Introduction and Service Guide, TIA/EIA/IS-707-A.1 (PN-4145.1), Ballot Resolution Version, pp. 1-1 thru 4-1, Mar. 1999.

TR 45, Data Service Options for Spread Spectrum Systems: Radio Link Protocol, TIA/EIA/IS-707-A.2 (PN-4145.2), Ballot Resolution Version, pp. 1-1 thru 4-11, Mar. 1999.

TR 45, Data Service Options for Spread Spectrum Systems: AT Command Processing and the Rm Interface, TIA/EIA/IS-707-A.3 (PN-4145.3), Ballot Resolution Version, pp. 1-1 thru 8-9, Mar. 1999.

TR 45, Data Service Options for Spread Spectrum Systems: Async Data and Fax Services, TIA/EIA/IS-707-A.4 (PN-4145.4), Ballot Resolution Version, pp. 1-1 thru 5-1, Mar. 1999.

TR 45, Data Service Options for Spread Spectrum Systems: Packet Data Services, TIA/EIA/IS-707-A.5 (PN-4145.5), Ballot Resolution Version, pp. 1-1 thru 4-2, Mar. 1999.

TR 45, Data Service Options for Wideband Spread Spectrum Systems: STU-III Services, TIA/EIA/IS-707-A.6 (PN-4145.6), Ballot Resolution Version, pp. 1-1 thru 3-4, Mar. 1999.

TR 45, Data Service Options for Spread Spectrum Systems: Analog Fax Service, TIA/EIA/IS-707-A.7 (PN-4145.7), Ballot Resolution Version, pp. 1-1 thru 11-4, Mar. 1999.

TR 45, Data Service Options for Spread Spectrum Systems: Radio Link Protocol Type 2, TIA/EIA/IS-707-A.8 (PN-4145.8), Ballot Resolution Version, pp. 1-1 thru 4-12, Mar. 1999.

TR 45, Data Service Options for Spread Spectrum Systems: High Speed Packet Data Services, TIA/EIA/IS-707-A.9 (PN-4145.9), Ballot Resolution Version, pp. 1-1 thru 4-2, Mar. 1999.

TR 45, Data Service Options for Spread Spectrum Systems—Addendum 1, PN-4541, TIA/EIA/IS-707-A-1, Ballot Version, pp. 1-2, Oct. 1999.

TR 45, Data Service Options for Spread Spectrum Systems: Radio Link Protocol Type 3, TIA/EIA/IS-707-A-1.10 (PN-4541.10), Ballot Version, pp. 1-1 thru 4-14, Oct. 1999.

TR 45, Data Service Options for Spread Spectrum Systems: cdma2000 High Speed Packet Data Service, TIA/EIA/IS-707-A-1.11 (PN-4541.11), Ballot Version, pp. 1-1 thru 4-2, Oct. 1999.

TR 45.5/99.10.13.01, Lake Louise, Alberta, Canada, (1998).

G. Dommety and K. Leung, "Mobile IP Vendor/Organization-Specific Extension," Network Working Group, pp. 1-8, Feb. 2001.

G. Dommety and K. Leung, "Mobile IP Vendor/Organization-Specific Extensions," Network Working Group, rfc3115, pp. 1-9, Apr. 2001.

D. Black, "Differentiated Services and Tunnels," Network Working Group, rfc2983, pp. 1-13, Oct. 2000.

S. Brim et al., "Per Hop Behavior Identification Codes," Network Working Group, rfc2836, pp. 1-7, May 2000.

V. Jacobson et al., "An Expedited Forwarding PHB," Network Working Group, rfc2598, pp. 1-10, Jun. 1999.

J. Heinanen et al., "Assured Forwarding PHB Group," Network Working Group, rfc2597, pp. 1-10, Jun. 1999.

S. Blake et al., "An Architecture for Differentiated Services," Network Working Group, rfc2475, pp. 1-33, Dec. 1998.

K. Nichols et al., "Definition of the Differentiated Services Field (DS Field) in the IPv4 and IPv6 Headers," Network Working Group, rfc2474, Dec. 1998.

S, Killet et al., "Using Domains in LDAP/x.500 Distinguished Names," Network Working Group, rfc2247, pp. 1-7, Jan. 1998.

T. Dierks and C. Allen, "The TLS Protocol Version 1.0," Network Working Group, rfc2246, pp. 1-72, Jan. 1999.

C. Newman, "Anonymous SASL Mechanism," Network Working Group, rfc2245, pp. 1-5, Nov. 1997.

J. Wroclawski, "The Use of RSVP with IETF Integrated Services," Network Working Group, rfc2210, pp. 1-30, Sep. 1997.

R. Braden and L. Zhang, "Resource Reservation Protocol (RSVP)—Version 1 Message Processing Rules," Network Working Group, rfc2209, pp. 1-23, Sep. 1997.

Mankin, Ed., et al., "Resource Reservation Protocol (RSVP) Version 1 Applicability Statement Some Guidelines on Deployment," Network Working Group, rfc2208, pp. 1-6, Sep. 1997.

L. Berger and T. O'Malley, "RSVP Extensions for IPSEC Data Flows," Network Working Group, rfc2207, pp. 1-13, Sep. 1997.

F. Baker et al., "RSVP Management Information Base Using SMIv2," Network Working Group, rfc2206, pp. 1-57, Sep. 1997.

Braden, Ed., et al., "Resource Reservation Protocol (RSVP)—Version 1 Functional Specification," Network Working Group, rfc2205, pp. 1-100, Sep. 1997.

Mobile IP Working Group, Internet Draft, Mobile IP Based Micro Mobility Management Protocol in Third Generation Wireless Network, pp. 1-15, May 2001.

* cited by examiner

METHOD AND SYSTEM FOR FACILITATING END-TO-END QUALITY OF SERVICE IN A WIRELESS PACKET DATA SYSTEM

REFERENCE TO RELATED APPLICATION

The inventors claim priority to U.S. Provisional Patent Application Ser. No. 60/263,482, filed Jan. 23, 2001.

BACKGROUND

1. Field of the Invention

The present invention relates to wireless communications systems and, more particularly, to quality of service in 3G wireless communications systems such as cdma2000.

2. Description of Related Art

In the existing art, there are at least three basic packet data services that call for associated levels of quality of service (QoS). These three services are (i) normal web activity, such as FTP, HTTP and e-mail services, (ii) streaming media, such as streaming audio and video, and web casting, and (iii) real-time two-way conversational grade service.

Normal web activity, such as file transfers, e-mail access and general web browsing can operate with a low quality of service. For such services, a simple "best effort" service level is therefore acceptable.

Non-real time media transfers (e.g., broadcasts of audio or video, such as radio broadcasts for instance) over a packet-switched network may require a higher level of service quality. Such services are largely unidirectional, with a host sending data (e.g., packetized media) to a client, and the client sending only a relatively small quantity of acknowledgement data back to the host. In some cases, the client terminal might provide a buffer for the incoming media, so that the user will actually hear/see the media with a brief delay, such as a second or more. This type of service can tolerate variations in delay and data loss, but it may require more bandwidth than simple file transfers or the like.

Real-time media transmissions over a packet-switched network, such as audio conferencing (e.g., voice over IP) or video conferencing (packet video services) for instance, have little tolerance for delay and for transmission errors (such as packet or data loss). Such services generally call for a premium level of service quality.

For any communication in a telecommunications network from one endpoint to another (end-to-end, or E2E), a desired level of QoS can be provided only if all portions of the communications path from end-to-end can be set up to support at least that desired level of QoS. If any portion of the communications path does not support at least the desired level of QoS, that portion will serve to restrict the end-to-end QoS.

3G wireless telecommunications networks, such as cdma2000 networks, raise a new issue in this regard.

Generally, in a wireless telecommunications network, an area is divided geographically into a number of cell sites. Each cell site is defined by a radio frequency (RF) air interface from a base transceiver station (BTS) antenna. The BTS antenna is then coupled to a base station controller (BSC), which controls communications over the air interface, such as by dictating power levels and other parameters. (Together, the BTS and BSC may therefore be considered to define a "base station system" or simply a "base station.") In turn, the BSC is coupled with a switch or gateway, which provides connectivity with a transport network such as the public switched telephone network (PSTN) or the Internet.

A mobile station operating in the cell site can then communicate with a node on the transport network, via a communication path including the air interface, the base station, the gateway and the transport network.

In a 3G wireless telecommunications network, a packetized communication path is provided between a mobile station and the transport network, as illustrated by way of example in FIG. 1. In this arrangement, a mobile station 12 communicates over an air interface 14 with a BTS 16 and in turn with a BSC 18 (the BTS 16 and BSC 18 cooperatively defining a base station 20). BSC 18 is then coupled by an industry standard A10/A11 link to a packet data serving node (PDSN) 22, which, as a network access server, provides connectivity with a packet-switched network 24 such as the Internet. A remote node 26 may in turn sit on or be accessible via the packet-switched network.

The mobile station may take various forms. For instance, it can be cellular or PCS telephone, or it can be a notebook computer or personal digital assistant (PDA) that includes or is connected with a cellular or PCS telephone or with a wireless communications card. Other examples are possible as well.

As further shown in FIG. 1, end-to-end communication may be established from the mobile station 12 to the remote node 26 over a packetized communication path made up of three segments: (A) the air interface 14 between the mobile station and the base station, (B) the A10 link between the base station and the PDSN, and (C) the packet-switched network 24 between the PDSN and the remote node. Thus, a packet sequence representing a communication from the mobile station passes through these three segments to the remote node, and a packet sequence representing a communication from the remote node passes through these three segments to the mobile station.

To provide a designated level of QoS for communications between the mobile station and remote node, all portions of the communication path between the mobile station and the remote node should support at least the designated level of QoS. In the existing art, methods are known for helping to set up and provide a designated level of QoS over the first and third of these parts, the air-interface and the packet-switched network. Further, the segment between the base station and the PDSN can be assumed to provide a sufficient grade of service for all users without requiring any QoS management.

However, the present inventors have discovered that what is missing is some method for consistently linking the levels of QoS established in the first and third segments, so as to help provide a complete end-to-end QoS solution.

SUMMARY

The present invention provides a mechanism for correlating QoS levels between separate links in a communication network. The invention is particularly applicable to support end-to-end (E2E) QoS in a wireless packet data network, such as the 3G (e.g., cdma2000) network described above. However, the network may take other forms as well. To help generalize, FIG. 2 depicts a simplified block diagram of an exemplary network 100.

In network 100, a first client C1 is coupled by a communication link A to a first server S1. Server S1 is then coupled by a communication link B to a second server S2. And server S2 is coupled by a communication link C to a second client C2. In this arrangement, the terms "client" and "server" may represent any network entities, such as mobile station and base station, or PC and network access server for instance.

Further, various intermediate entities may be provided. For example, server S2 may provide connectivity with a transport network on which another server (not shown) is linked with client C2. Other examples are possible as well.

In the arrangement of network 100, server S1 manages QoS on link A, and server S2 manages QoS on link C. Further, it can be assumed that either link B is sufficient to support any level of QoS, or QoS over link B is also managed in some way.

As a general matter, client C1 may engage in signaling communication with server S1 to establish a communication session with client C2. For instance, client C1 may send an origination message to server S1. In response, server S1 may signal to server S2, and server S2 may set up the communication session to client C2. As a result, an end-to-end communication session may be established from client C1 to server S1 to server S2 to server S2 to client C2.

In this communication session, a first layer of communication may exist between client C1 and server S1 over link A, and a second layer of communication may exist between client C1 and server S2 over links A and B. For example, the first layer of communication may be link-layer communication (e.g., air interface communication), and the second layer of communication may be IP layer communication (e.g., IP packets). Other examples are possible as well.

According to the exemplary embodiment, server S1 and server S2 may communicate QoS information with each other over link B, so that server S1 can set up a level of QoS on link A that correlates (e.g., is consistent with) a level of QoS that server S2 sets up on link C (and vice versa). For this purpose, server S1 and/or server S2 (or another entity) may translate between QoS levels described for link A and QoS levels described for link C.

By way of example, client C1 may communicate with server S2 (e.g., via IP-layer communications) to request a certain level of QoS over link C. In addition to setting up or allowing that level (or an authorized level) of QoS over link C, server S2 may map the QoS level to a corresponding level of QoS for link A, and server S2 may then signal to server S1, providing server S1 with an indication of the corresponding level of QoS for link A. Server S1 may then seek to set up that corresponding level of QoS over link A.

As another example, client C1 may communicate with server S1 (e.g., via link-layer communications) to request a certain level of QoS over link A. In addition to setting up or allowing that level (or an authorized level) of QoS over link A, server S1 may signal to server S2, providing server S2 with an indication of the level of QoS for link A. Server S2 may then map that QoS level to a corresponding level of QoS for link C, and server S2 may seek to set up that corresponding level of QoS over link C.

The end result is that, in the communication session between client C1 and client C2, the QoS over link A can be made to correlate with the level of QoS over link C. In this manner, a consistent level of QoS can be achieved end-to-end over the communication path.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN
EXEMPLARY EMBODIMENT

Figure 1:
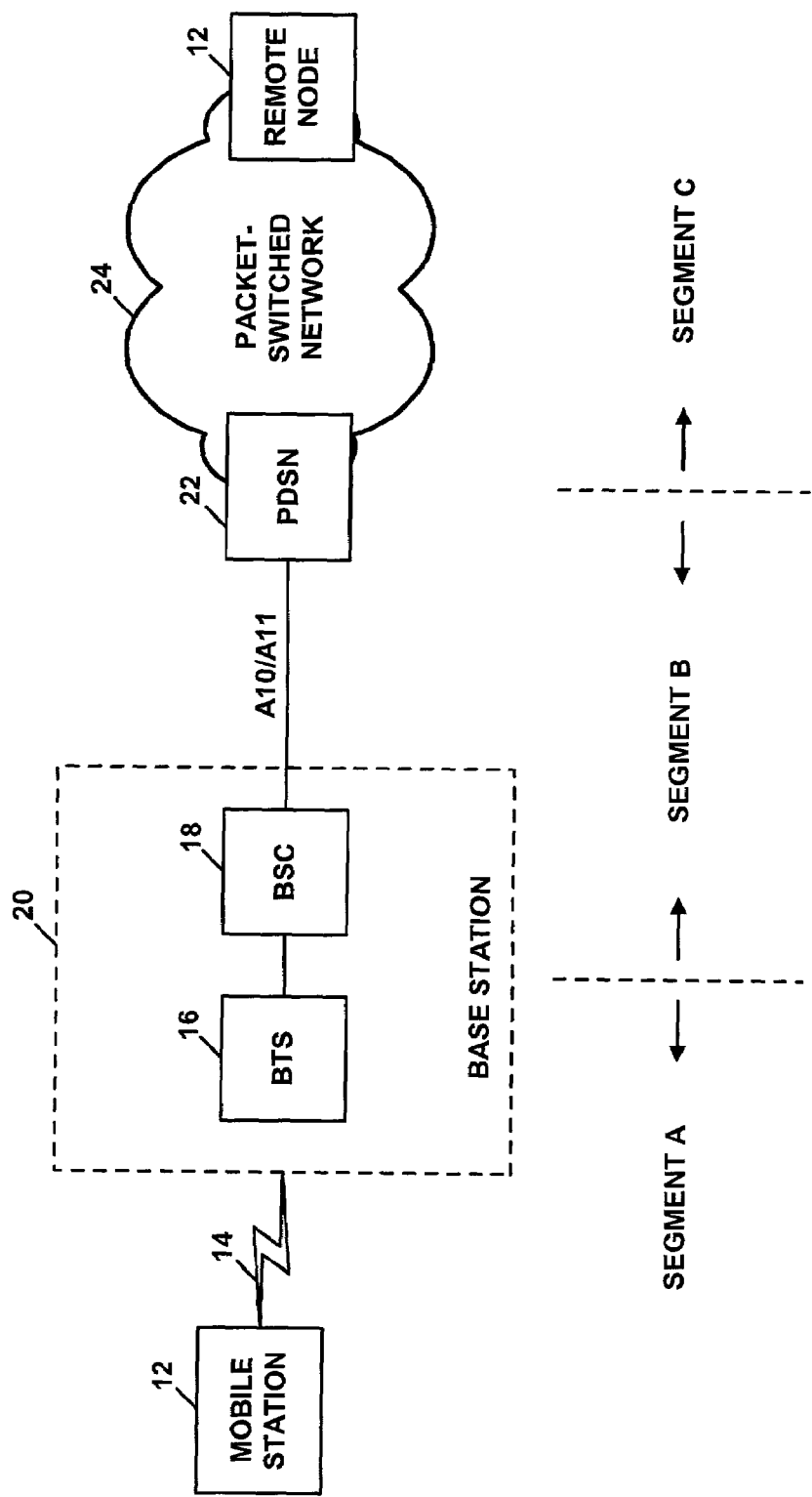
FIG. 1 is a block diagram of a cdma2000 wireless packet data network in which the exemplary embodiment can be employed.
Figure 2:
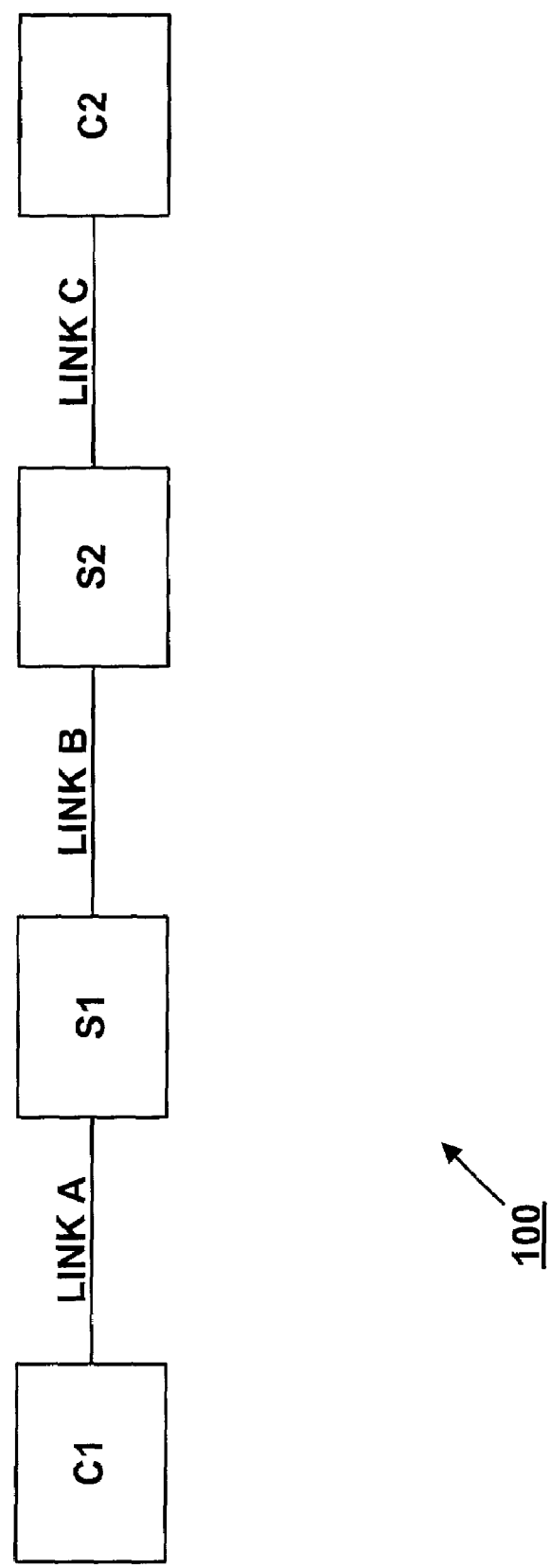
FIG. 2 is a generalized block diagram of a communications network in which the exemplary embodiment can be employed.

As noted above, the present invention is particularly applicable in the context of a 3G network, such as the cdma2000 network shown in FIG. 1. Although the network may take other forms as well, the exemplary embodiment will therefore be described in that context. Further, the exemplary embodiment will be described in terms of certain example QoS mechanisms. However, those skilled in the art will appreciate that the techniques described herein can be readily adapted to provide support for other QoS mechanisms as well.

1. Exemplary QoS Mechanisms for the cdma2000 Air Interface

Various mechanisms exist for providing QoS over a cdma2000 air interface. By way of example, two such methods are defined by in section 2.2.9 of industry standard IS-707a2.12 (EIA/TIA/IS-707-A-2.12, entitled "Data Service Options for Spread Spectrum Systems: cdma2000 High Speed Packet Data Service Option 33," and dated January 2000), which is hereby incorporated by reference. These two methods are (i) non-assured QoS and (ii) assured QoS.

Non-assured QoS is defined as a mechanism for establishing a simple priority level for users that are competing for air interface resources. Each subscriber (e.g., each mobile station) may have an associated priority level, which may be calculated based on a statically configured parameter in the subscriber's home location register (HLR). The mobile station may request adjustment to the default priority level (e.g., requesting a temporary allocation of higher bandwidth) by sending a "block of bits" (BLOB) in a signaling message to the BSC, and the BSC can respond accordingly.

In general, non-assured QoS is only applicable when there are insufficient resources to serve all of the customers requesting service. In such a scenario, the users with the lowest grade priority service could be denied service.

Assured QoS in the cdma2000 air interface, on the other hand, defines more QoS parameters than just a priority level. Assured QoS is made up of the following sets of parameters:

Priority—This is the same type of priority as is in non-assured. It is used to determine resource allocation in the event that there are not enough resources available for all that is requesting the service.

Minimum Requested Data Rate (Forward and Reverse Link)—This is the requested minimum data rate, defined in kbps, that a user wants. This means that the user would like their data rate to not go below this level.

Minimum Acceptable Data Rate (Forward and Reverse Link)—This is the minimum data rate that a user will accept. If the data rate falls below this level then the network or mobile may determine what to do (either accept a lower rate, disconnect the call, etc.)

Maximum Acceptable Delay (Forward and Reverse Link) —This is the maximum level of delay that the user will accept in their packet data call.

Maximum Requested Delay (Forward and Reverse Link) —This is the requested maximum delay that a user would like in their packet data call.

Requested Data Loss Rate (Forward and Reverse Link) —This is the amount of data loss that a user can accept in their call.

Acceptable Data Loss Rate (Forward and Reverse Link) —This is the maximum data loss that a user can have in their packet data call.

In general, all of these parameters, except for the PRIORITY parameter, are actually two parameters, one for the reverse link (from the mobile station to the base station) and another for the forward link (from the base station to the mobile station). A mobile station can specify these parameters in a QoS BLOB, and the base station can respond in a QoS BLOB to the mobile station.

In cdma2000, the block of bits, or BLOB, signaling parameter can be used to communicate QoS information (e.g., messages about QoS) between the mobile station and base station, during call setup and eventually during a call. Thus, for instance, the mobile station may send a request for a particular level of QoS, and the base station may send a respective response to the mobile station. The mobile station and base station may thereby work together to agree upon a particular level of QoS for the cdma2000 air interface.

2. Exemplary QoS Mechanisms for the Internet

Similarly, various methods exist for setting up and providing a desired level of QoS over the Internet, such as between a PDSN and a remote node. By way of example, known methods include differentiated services (DiffServ, or diff-serv), and RSVP (resource reservation protocol). In addition, other methods include permanent virtual paths (PVPs) in ATM networks and MPLS label switched paths in IP networks.

Diff-serv is defined in various Internet Engineering Task Force (IETF) documents, such as RFCs 2474, 2475, 2597, 2598, 2836 and 2983, for instance, and is well known to those skilled in the art. In general, diff-serv works on a "per hop" basis, allowing each router hop to act according to a requested diff-serv marking in the IP header of the packets. In particular, each packet can be marked with a diff-serv priority level, which routers an use to allocate service resources among packets (e.g., a packet with a higher priority might be sent more quickly or with higher bandwidth, etc.) This step-by-step approach to QoS works on a packet-by-packet basis and generally does not involve any reservation of resources.

Resource Reservation Setup Protocol (RSVP), in turn, is defined in IETF documents such as RFCs 2205–2209 and RFCs 2245–2247 and is also well known to those skilled in the art. As the name implies RSVP is a protocol that calls for reserving resources across the networks, to insure requested behavior. According to this protocol, a transmitting node will actually signal across a network to ensure that resources of various sorts (e.g., bandwidth, etc.) are available and reserved for a given communication. Once the resources are secured, the transmitting node will then begin transmitting data across the network.

3. Establishing Communication and QoS in the 3G Network

In general, when packet-data communication is set up between a mobile station and the Internet, two separate layers of communication occur at once. First, the BSC and mobile station communicate with each other in a radio-link layer, through which the BSC manages air interface parameters. Second, the PDSN and the mobile station communicate with each other in an IP layer, through which packets are conveyed between the mobile station and the Internet.

For example, when a user of mobile station 12 seeks to initiate a packet-data session with remote node 26 on the Internet, the user may select a "packet-data" option through an application on the mobile station, and the mobile station may responsively send an origination message to the BSC. The origination message may conventionally carry a "packet-data" parameter as well as a QoS BLOB, indicating the level of QoS desired by the mobile station.

In response to the origination message, the BSC may refer to a service profile for the mobile station and, based on the service profile as well as current traffic conditions, may set a level of QoS over the air interface. (Alternatively, if the mobile station does not specify a requested QoS level, the BSC may autonomously set an acceptable QoS level.) Further, during the course of a given communication session, the mobile station and BSC may negotiate for changes to the level of QoS over the air interface.

In addition, also in response to the origination message, the BSC will generate A11 signaling to the PDSN to set up a A10 bearer path between itself and the PDSN dedicated to the mobile station and allowing the mobile station and the PDSN to then negotiate a connection. Typically, the connection formed between the mobile station and the PDSN will be a point-to-point protocol (PPP) session, in which IP packets are framed and carried over a series of different physical links between the mobile station and the PDSN. Through parameters in the headers in these IP packets, the mobile station can ask the PDSN to establish a certain level of QoS over the Internet. And the PDSN can respond accordingly, either providing the requested level or not.

4. Providing End-to-End Quality of Service

With the scenario just described, it is thus possible to set up a level of QoS over the air interface through radio-link layer communications, and it is possible to separately set up a level of QoS over the Internet through IP-layer communications. However, the scenario does not provide a way to match those two levels of QoS, so as to provide a desired level of end-to-end QoS.

In accordance with the exemplary embodiment, this problem is solved by communicating QoS information between the BSC and the PDSN, and mapping between the air interface QoS parameters and Internet QoS parameters. Communications between the BSC and the PDSN can be carried over an industry standard A11 signaling link or other channel. Further, the mapping between air interface QoS parameters and Internet QoS parameters can be carried out by the PDSN, by the BSC or by another entity.

Figure 3:
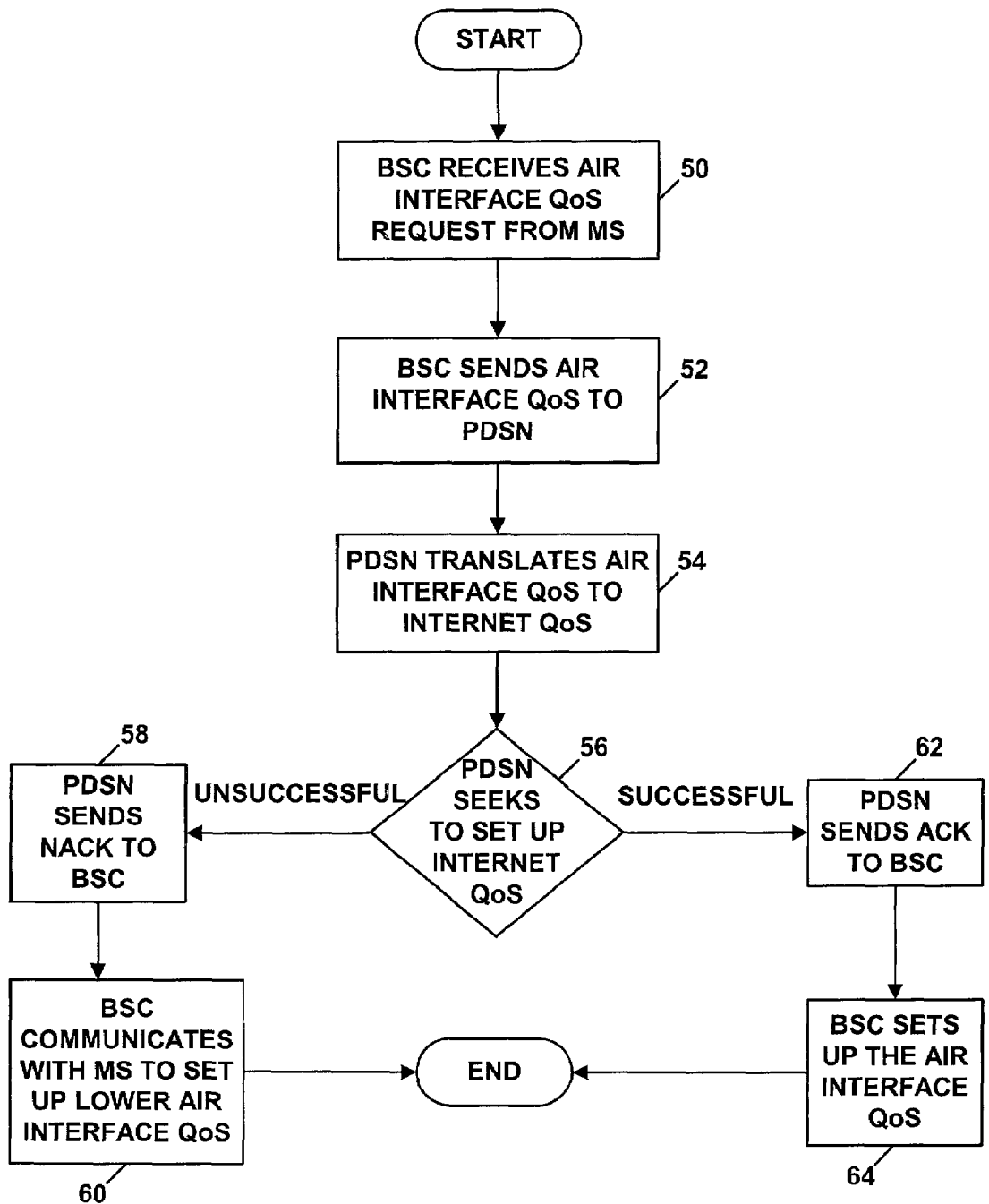
FIG. 3 is flow chart depicting a set of functions that may be employed in the exemplary embodiment.
Figure 4:
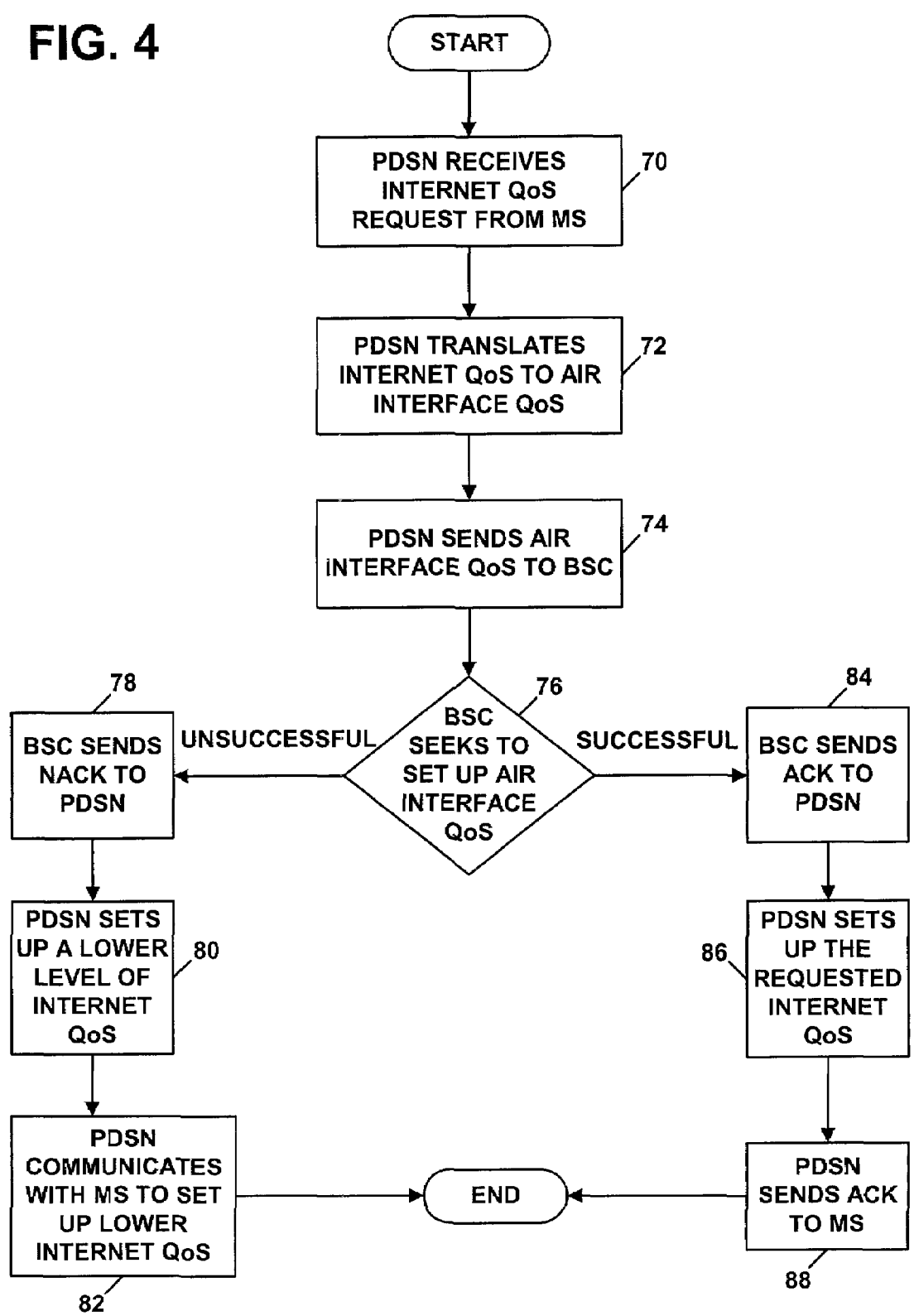
FIG. 4 is a flow chart depicting another set of functions that may be employed in the exemplary embodiment.

This process is generally illustrated by the flow charts set forth as FIGS. 3 and 4. In particular, FIG. 3 depicts a process where the mobile station asks the BSC for a certain level of QoS (via radio-link layer communication), and FIG. 4 depicts a process where the mobile station asks the PDSN for a certain level of QoS (via IP layer communication).

Referring first to FIG. 3, at block 50, the BSC receives a radio-link layer request from the mobile station for a certain level of air interface QoS. In response, at block 52, the BSC communicates the requested level of air interface QoS via A11 signaling to the PDSN. At block 54, the PDSN then translates the requested level into a corresponding level of Internet QoS, and, at block 56, the PDSN seeks to set up that level of Internet QoS. (Alternatively, the BSC or another entity may perform the translation between air interface QoS levels and Internet QoS levels.)

At block 58, if the PDSN is unable to establish that corresponding level of Internet QoS, the PDSN may then send an A11 signal back to the BSC, indicating so. At block 60, the BSC may then communicate with the mobile station on the radio-link to set up a lower level of air interface QoS (or the BSC and PDSN can negotiate further via A11 signaling). Alternatively, at block 62, if the PDSN can establish that corresponding level, it may send an acknowledgement to the BSC. At block 64, the BSC may then set up the requested level of air interface QoS.

Referring next to FIG. 4, at block 70, the PDSN receives from the mobile station an IP layer request (e.g., designated in IP packet headers over the A10 link) for a certain level of Internet QoS. At block 72, the PDSN translates the requested level into a corresponding level of air interface QoS and, at block 74, the PDSN communicates the requested level of air interface QoS to the BSC via A11 signaling. At block 76, the BSC then seeks to set up that level of air interface QoS for the mobile station (e.g., by checking with the mobile station's service profile and considering capacity issues for instance).

At block 78, if the BSC is unable to establish that corresponding level of internet QoS, the BSC sends an A11 signal back to the PDSN, indicating so. At block 80, the PDSN then tries to set up a lower level of Internet QoS (or the PDSN and BSC may negotiate further), and at block 82, the PDSN signals to the mobile station over the IP layer (e.g., over the A10 link), indicating the provided level of QoS. Alternatively, at block 84, if the BSC can establish the corresponding level of air interface QoS, it sends an acknowledgement to the PDSN. At block 86, the PDSN then sets up the requested level of Internet QoS, and, at block 88, the PDSN acknowledges this to the mobile station.

Variations on these flow charts (e.g., the order of functions, and the functions themselves) are possible. For example, when PDSN receives an IP layer QoS request from the mobile station, the PDSN can seek to set up that QoS on the Internet before checking with the BSC to see if a consistent level of air interface QoS is available. Similarly, when the BSC receives a radio-link layer QoS request from the mobile station, the BSC can seek to set up that QoS on the air interface before checking with the BSC to see if a consistent level of Internet QoS is available. Other examples are possible as well.

QoS communications between the BSC and PDSN can be made in any desired manner. Since the BSC and PDSN will be programmed to engage in these communications, however, it would be best to employ a message set with which the BSC and PDSN may already be programmed. In accordance with the exemplary embodiment, one such message set consists of IP/UDP packets containing Mobile IP message headers with A11-specific parameters and extensions as defined by IS-2001.

As is known in the art, Mobile-IP defines several standard messages including (i) a Registration Request, (ii) a Registration Reply, (iii) a Registration Update, and (iv) a Registration Update Acknowledgement. Further, a set of "vendor extensions," or user-definable fields, have been proposed in the industry for inclusion in these Mobile-IP messages. As described in G. Dommety and K. Leung, "Mobile IP Vendor/Organization-Specific Extensions," IETF RFC 3115, April 2001 (hereafter RFC 3115 (formerly RFC 3025), hereby incorporated by reference), these vendor extensions include (i) a type, (ii) a length, (iii) a vendor ID, (iv) a vendor-specific type of the extension, (v) vendor-specific value/data of the extension. See also "Mobile IP Based Micro Mobility Management Protocol in the Third Generation Wireless Network," draft-mobileip-3gwireless-ext-06, May 2001 (also hereby incorporated by reference), which defines aspects of Mobile-IP messaging.

In accordance with the exemplary embodiment, air interface QoS information such as priority, data rate, data delay, and data loss information can be conveniently passed between the base station and PDSN in these vendor extensions in any of the Mobile IP messages noted above. In particular, by way of example, (i) the vendor-specific type can indicate that the extension is a QoS extension, and (ii) the vendor-specific value/data can include the parameters set forth in Table 1 (corresponding to the air interface QoS types defined in section 2.2.9 of IS707a2.12).

TABLE 1

| PARAMETER | LENTGH | DESCRIPTION |
| --- | --- | --- |
| QoSType | 4 bits | The QoS type of the mobile device based on the service provisioned in the HLR |
| Rvd1 | 4 bits | Reserved bits. These should be set to zero and ignored. |
| F_Data_Loss | 1 byte | Requested forward Data Loss (bits 0–3) and acceptable forward Data Loss (bits 4–7) |
| R_Data_Loss | 1 byte | Requested reverse Data Loss (bits 0–3) and acceptable reverse Data Loss (bits 4–7) |
| F_Data_Rate | 1 byte | Requested forward Data Rate (bits 0–3) and acceptable forward data Rate (bits 4–7) |
| R_Data_Rate | 1 byte | Requested reverse Data Rate (bits 0–3) and acceptable reverse Data Rate (bits 4–7) |
| F_Data_Delay | 1 byte | Requested forward Data Delay (bits 0–3) and acceptable forward Data Delay (bits 4–7) |
| R_Data_Delay | 1 byte | Requested reverse Data Delay (bits 0–3) and acceptable reverse Data Delay (bits 4–7) |
| Rvd2 | 4 bits | Reserved bits. These should be set to zero and ignored. |
| Pri | 4 bits | The air interface priority maintained in the HLR profile of the device. |

As noted above, under existing standards, two types of air interface QoS exist, (i) assured and (ii) non-assured. Conveniently, the vendor-specific type field indicated in the vendor extension can also include two elements, an "application-type" and an "application sub-type." According to the exemplary embodiment, a service provider may define an application-type of "QoS" and two air interface QoS sub-types, one for assured QoS (e.g., 0001) and the other for non-assured QoS (e.g., 0000).

If the vendor-type (application-subtype) indicates that the QoS type is non-assured, then only the last byte (PRI) shown in Table 1 would be included in the value/data field. On the other hand, if the vendor-type indicates that the QoS is assured, then the other more specific QoS fields listed in Table 2 can be included in the value/data field. Together, the vendor-specific type and vendor-specific value/data can thereby convey air interface QoS information.

A processor in the PDSN may then be programmed to map between these air interface QoS levels and corresponding Internet QoS levels. In particular, the PDSN may include or have access to a translation tables for each of the categories of QoS listed above, correlating these air interface QoS levels with Internet QoS levels, and the PDSN can refer to those tables to map between values.

Figure 5:
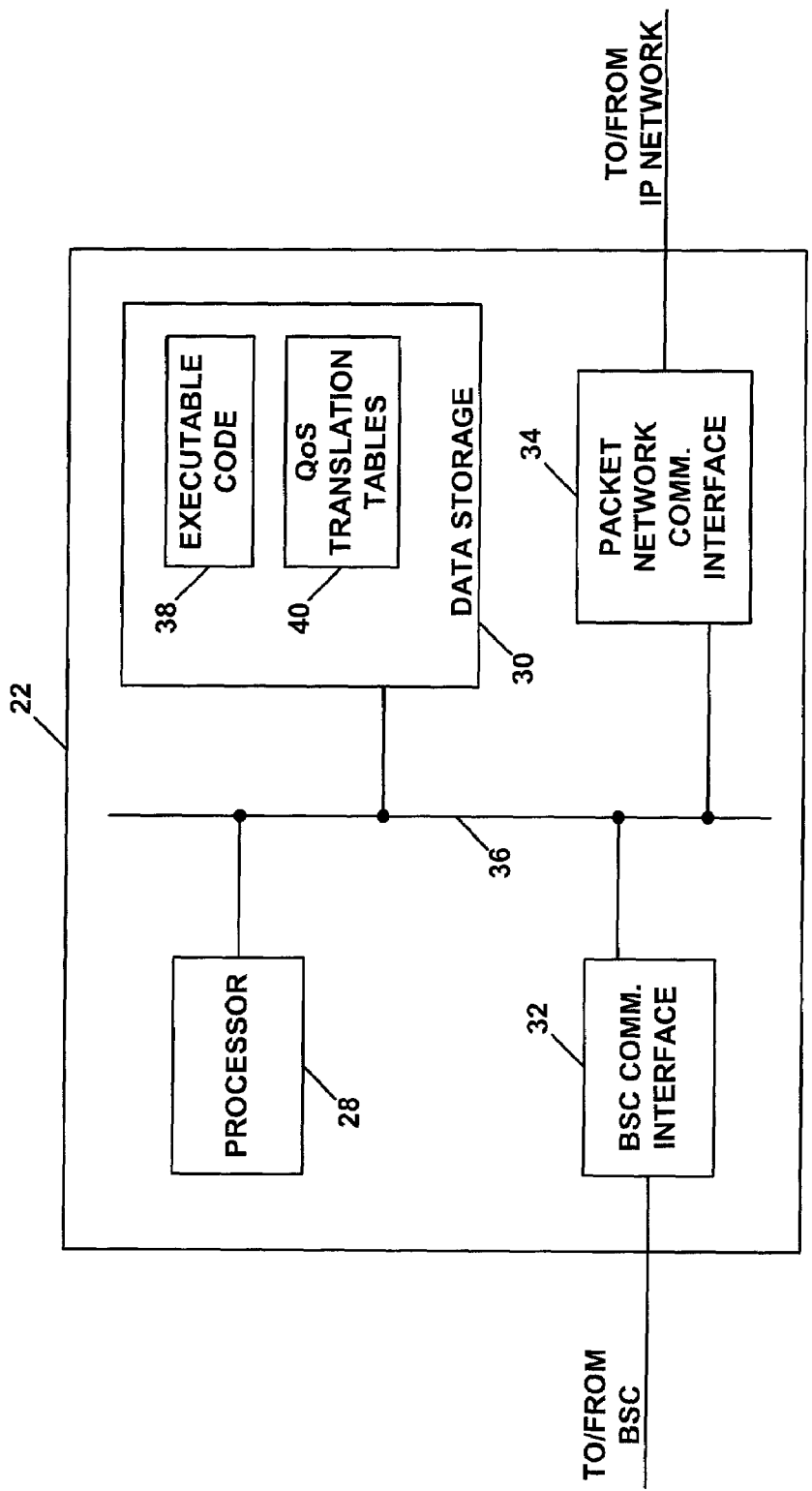
FIG. 5 is a functional block diagram of a packet data serving node for use in the exemplary embodiment.

FIG. 5 is a simplified block diagram of a PDSN 22 arranged to perform these functions. As shown in FIG. 5, PDSN 22 includes a processor 28, data storage 30, a BSC communication interface 32, and a packet-switched network communication interface 34, all interconnected by a system bus 36. Data storage 30 may include (i) program instructions 38 executable by processor 28 to carry out the functions described herein and (ii) the translation tables 40 for mapping between QoS information. By way of example, PDSN 22 can be embodied by a CommWorks Total Control network access server, which provides connectivity between circuit connections on one hand and packet connections on the other hand.

Thus, in operation, when the PDSN receives a request for a certain level (or levels) of air interface QoS from the BSC (e.g., via A11 signaling), the PDSN can refer to the translation tables to translate the air interface QoS into corresponding Internet QoS. Similarly, when the PDSN receives a request for a certain level (or levels) of Internet QoS from the mobile station (e.g., over the A10 link), the PDSN can refer to the translation tables to translate the Internet QoS into corresponding air interface QoS (and can signal that corresponding air interface QoS to the BSC (e.g., via A11 signaling)).

Example versions of these translation tables are set forth as Tables 2–6 below, with respect to the bit values for various air interface QoS parameters as defined in IS707a2.12. For instance, Table 2 maps Internet QoS priority level and bits of the Priority field that are defined by IS-707.

TABLE 2

| Priority Level | PRI Bits |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

Table 3, in turn, maps Internet QoS data rates with bits of the data rate fields that are defined by IS-707. Currently, IS-707 defines five bit strings for acceptable and requested levels of data rates in both the forward and reverse air interface channels.

TABLE 3

| Data Rate | DATA_RATE Bits |
|---|---|
| 8 kbps | 0001 |
| 32 kbps | 0010 |
| 64 kbps | 0011 |

TABLE 3-continued

| Data Rate | DATA_RATE Bits |
|---|---|
| 144 kbps | 0100 |
| 384 kbps | 0101 |
| *** | All others reserved for future use |

Thus, in the exemplary embodiment, the DATA_RATE Values listed in Table 3 can be used when defining both the requested and acceptable data rate values in both the forward and reverse air interface links.

Table 4, in turn, maps Internet data loss values with bits of the data loss fields as defined by IS-707. Current, IS-707 defines four values for acceptable and requested levels of data loss in both the forward and reverse air interface channels.

TABLE 4

| Data Loss | DATA_LOSS Bits |
|---|---|
| 1% Loss | 0001 |
| 2% Loss | 0010 |
| 5% Loss | 0011 |
| 10% Loss | 0100 |
| *** | All others reserved for future use |

Thus, in the exemplary embodiment, the DATA_LOSS values listed in Table 4 can be used when defining both the acceptable and requested data loss values in both the forward and reverse air interface channels.

Table 5, in turn, maps Internet data delay values with bits of the data delay fields as defined by IS-707. Currently, IS-707 defines three values for acceptable and requested levels of data delay in both the forward and reverse air interface channels.

TABLE 5

| Data Delay | DATA_DELAY Bits |
|---|---|
| 40 ms | 0001 |
| 120 ms | 0010 |
| 360 ms | 0011 |
| *** | All others reserved for future use |

Thus, in the exemplary embodiment, the DATA_DELAY values listed in Table 5 can be used when defining both the acceptable and requested data delay values in both the forward and reverse air interface channels.

As noted above, other types of QoS may be supported as well. For example, if the PDSN supports an ATM connection, a translation table may be provided to map between air interface QoS levels (both assured and non-assured) and ATM QoS parameters. For instance, mapping may be provided between (i) data loss and cell loss ratio, (ii) data delay and cell transfer delay, (iii) priority and traffic management priority control, and (iv) data rate and SVC or AAL1 connections needed to ensure data rates.

The values in these translation tables can be operator-configured, through an administrator interface for instance.

Further, the translation tables could in theory be tied to user profiles or arranged to provide particular levels pursuant to service level agreements (SLAs).

5. Examples

The following examples help illustrate operation of the exemplary embodiment in practice. It should be understood, however, that other examples are possible as well.

a. Diff-serv Initiated from Mobile Station

Assume that a user initiates a packet-data session from an application on notebook computer equipped with a wireless telecommunications adapter. In setting up a PPP link to the PDSN, the BSC establishes a default QoS level for the wireless telecommunications adapter, based on adapter's service profile and capacity considerations. Once a PPP session is established between the computer and the PDSN, the application then sends to the PDSN an IP packet that includes a diff-serv priority level of "5" in its header.

The PDSN detects the diff-serv priority level and, referring to Table 2 above, maps the priority level to PRI bits 0101. The PDSN then sends an A11 Mobile-IP registration update message to the BSC, including the vendor extension noted above, with PRI set to 0101. In response, the BSC seeks to update the air interface QoS level to 0101 and sends a registration update message to the PDSN. In this manner, the packet will be transmitted over the Internet with diff-serv level 5, and the packets will (ideally) be transmitted over the air-interface with corresponding priority level 0101.

b. RSVP Invoked by PDSN

Assume that the user of the previous example initiates a packet-data session, so a PPP link is set up between the computer and the PDSN. Assume next that the PDSN queries an authentication server (e.g., a AAA server) and determines that the user should receive RSVP service with particular levels of data rate, data loss and data delay. The PDSN may then seek to set up those QoS levels via RSVP over the Internet.

Further, the PDSN may apply Tables 3–5 above to translate the levels into corresponding air interface QoS values. (Additionally or alternatively, other translation can be done to establish the fields defined by the RSVP FLOWSPEC in RFC 2210 section 3.2 for instance.) The PDSN may then send those air interface QoS values to the BSC in a vendor extension of a Mobile-IP registration update message, indicating a vendor-type of "assured." Thus (ideally), consistent air interface QoS and Internet QoS can be established.

C. Assured QoS Requested by Mobile Station

Assume that a user initiates a packet-data session by selecting "real-time media conference" from an application running on the mobile station. The mobile station application may be arranged to correlate "real-time media conference" with a desire for high QoS and may therefore include a request for assured QoS in an origination message that it sends to the BSC. In particular, the application may include a QoS BLOB that specifies particularly high values for data rate, data loss, data delay and priority.

Upon receipt of the message, a processor in the BSC may programmatically detect the request for assured QoS and, after verifying that the user entitled to that level of QoS and that sufficient air interface resources are available, may direct the allocation of resources accordingly. In turn, the BSC may send a Mobile-IP registration message to the PDSN, including a vendor extension that indicates an "assured" type and the desired QoS levels. The PDSN may then apply the translation tables above to translate those QoS levels into corresponding Internet QoS levels, and the PDSN may seek to set up those levels of QoS over the Internet.

In this regard, the PDSN may also query an authentication server to determine whether the user should receive RSVP treatment. If the PDSN thereby determines that the user should not receive RSVP treatment, then the PDSN may seek to establish the high priority level via diff-serv or may apply another suitable procedure. Alternatively, if the PDSN thereby determines that the user should receive RSVP treatment, then the PDSN may seek to set up the requested levels of QoS via RSVP.

d. Non-assured QoS Invoked by BSC

Assume that a user initiates a packet-data session and does not specify any QoS parameter in IP packets sent to the PDSN. Assume further that the BSC determines, based on various factors, that the user is entitled to only non-assured QoS over the air interface and that the air interface priority level is to be 3. Consequently, the BSC may send a Mobile-IP message to the PDSN, indicating a priority level of "0011" in the vendor extension. And the PDSN may map the priority level to priority level "3" and may then insert into each packet communicated from the user a diff-serv priority level "3". In this regard, diff-serv can be the default QoS mechanism used in the network for non-assured QoS.

6. Conclusion

An exemplary embodiment of the present invention has been described above. Those skilled in the art will understand, however, that changes and modifications may be made to this embodiment without departing from the true scope and spirit of the present invention, which is defined by the claims.

For example, while the foregoing description has assumed that the link between the PDSN and the BSC (and, in turn, between the BSC and BTS) will provide an acceptable grade of service for all users without requiring any QoS management, the invention can equally extend to an arrangement in which that link also requires QoS management of some sort.

What we claim is:

1. In a communications network of the type in which a first client communicates with a first server via a first link, a second server communicates with a second client via a second link, and the first server communicates with the second server via a third communications link, a method of managing quality of service for a communication between the first client and the second client, the method comprising:
    operating the first server to manage quality of service for the communication on the first link;
    operating the second server to manage quality of service for the communication on the second link; and
    operating the first server and the second server to match quality of service on the first link with quality of service on the second link.

2. The method of claim 1, wherein operating the first server and the second server to match quality of service on the first link with quality of service on the second link comprises:
    the second server mapping quality of service on the second link to corresponding quality of service on the first link; and
    the second server sending to the first server via the third communications link an indication of the corresponding quality of service on the first link.

3. The method of claim 2, further comprising:
    operating the first server to set up the corresponding quality of service on the first link.

4. The method of claim 2, wherein mapping quality of service on the second link to corresponding quality of service on the first link comprises:

using at least one stored translation table to identify the corresponding quality of service on the first link based on the quality of service on the second link.

5. The method of claim 1, wherein operating the first server and the second server to match quality of service on the first link with quality of service on the second link comprises:
    the first server sending to the second server via the third communications link an indication of quality of service on the first link; and
    the second server mapping quality of service on the first link to corresponding quality of service on the second link.

6. The method of claim 5, wherein mapping quality of service on the first link to corresponding quality of service on the second link comprises:
    using at least one stored translation table to identify the corresponding quality of service on the second link based on the quality of service on the first link.

7. A method of facilitating establishment of end-to-end quality-of-service for a communication in a wireless telecommunications network, the communication being passed along a communication path comprising a mobile station, an air-interface, a base station, a packet data serving node, and a packet-switched network, the method comprising:
    passing in a Mobile IP vendor extension between the base station and the packet data serving node at least one quality-of-service parameter for the communication.

8. A method of facilitating establishment of end-to-end quality-of-service for a communication in a wireless telecommunications network, the communication being passed along a communication path comprising a mobile station, an air-interface, a base station, a packet data serving node, and a packet-switched network, the method comprising:
    passing between the base station and the packet data serving node at least one quality-of-service parameter for the communication, wherein the at least one quality-of-service parameter is indicative of quality of service for the air-interface portion of the communication path; and
    operating the packet data serving node to map the at least one quality-of-service parameter into at least one corresponding quality-of-service parameter, the at least one corresponding quality-of-service parameter being indicative of quality-of-service for the packet-switched network portion of the communication path.

9. A method comprising:
    establishing radio-link layer communication over an air interface between a mobile station and a base station;
    establishing IP layer communication between the mobile station and a network access server via the base station, the network access server providing connectivity with a packet-switched network, whereby the mobile station communicates IP packets to the network access server, and the network access server transmits the IP packets into the packet-switched network; operating the network access server to map between (i) air interface quality-of-service information and (ii) packet-switched network quality-of-service information; and
    communicating air interface quality-of-service information between the base station and the network access server.

10. The method of claim 9, further comprising:
    sending the air interface quality-of-service information from the base station to the network access server before the network access server performs the operating function.

11. The method of claim 9, further comprising sending the air interface quality-of-service information from the base station to the network access server in a Mobile-IP message.

12. The method of claim 11, wherein sending the air interface quality-of-service information from the base station to the network access server in a Mobile-IP message comprises sending the air interface quality-of-service information from the base station to the network access server in a Mobile-IP vendor extension.

13. The method of claim 9, further comprising:
    receiving the packet-switched network quality-of-service information at the network access server via the IP layer communication; and
    sending the air interface quality-of-service information from the network access server to the base station,
    wherein, operating the network access server to map between (i) air interface quality-of-service information and (ii) packet-switched network quality-of-service information comprises operating the network access server to translate the packet-switched network quality-of-service information to the air interface quality of service information.

14. The method of claim 13, further comprising sending the air interface quality-of-service information from the network access server to the base station in a Mobile-IP message.

15. The method of claim 14, wherein sending the air interface quality-of-service information from the network access server to the base station in a Mobile-IP message comprises sending the air interface quality-of-service information from the network access server to the base station in a Mobile-IP vendor extension.

16. A method comprising:
    operating a PDSN to detect at least one Internet quality-of-service level for a mobile station;
    operating the PDSN to set up the at least one Internet quality-of-service level for the mobile station;
    operating the PDSN to translate the at least one Internet quality-of-service level into at least one corresponding air interface quality-of-service level;
    sending the at least one air interface quality-of-service level from the PDSN to a base station; and
    operating the base station to set up the at least one air interface quality-of-service level over an air interface between the base station and the mobile station.

17. The method of claim 16, wherein operating the base station to set up the at least one air interface quality-of-service level over an air interface between the base station and the mobile station comprises:
    operating the base station to validate the at least one air interface quality-of-service level; and
    operating the base station to communicate with the mobile station over the air interface so as to set up the air interface quality-of-service level.

18. A packet data serving node for use in a wireless packet data system, the packet data serving node comprising:
    translation data mapping between air interface quality-of-service parameters and Internet quality-of-service parameters; and
    a processor programmed to apply the translation data to map between air interface quality-of-service parameters and Internet quality-of-service parameters and to communicate air-interface quality-of-service information with a base station.

19. A system comprising:
    a base station in communication with a mobile station via an air interface;

the base station managing quality of service for communications with the mobile station via the air interface;
a packet data serving node providing connectivity with a packet-switched network;
the packet data serving node managing quality of service for communications with the mobile station via the packet-switched network;
the packet data serving node being communicatively coupled with the base station; and
the packet data serving node and base station being communicating quality of service information with each other so as to match (i) quality of service for communications with the mobile station via the first link with (ii) quality of service for communications with the mobile station via the packet-switched network.

* * * * *